Oct. 11, 1966  A. E. KLEIN, JR  3,278,118
FERTILITY CYCLE INDICATOR
Filed March 24, 1966  2 Sheets-Sheet 1
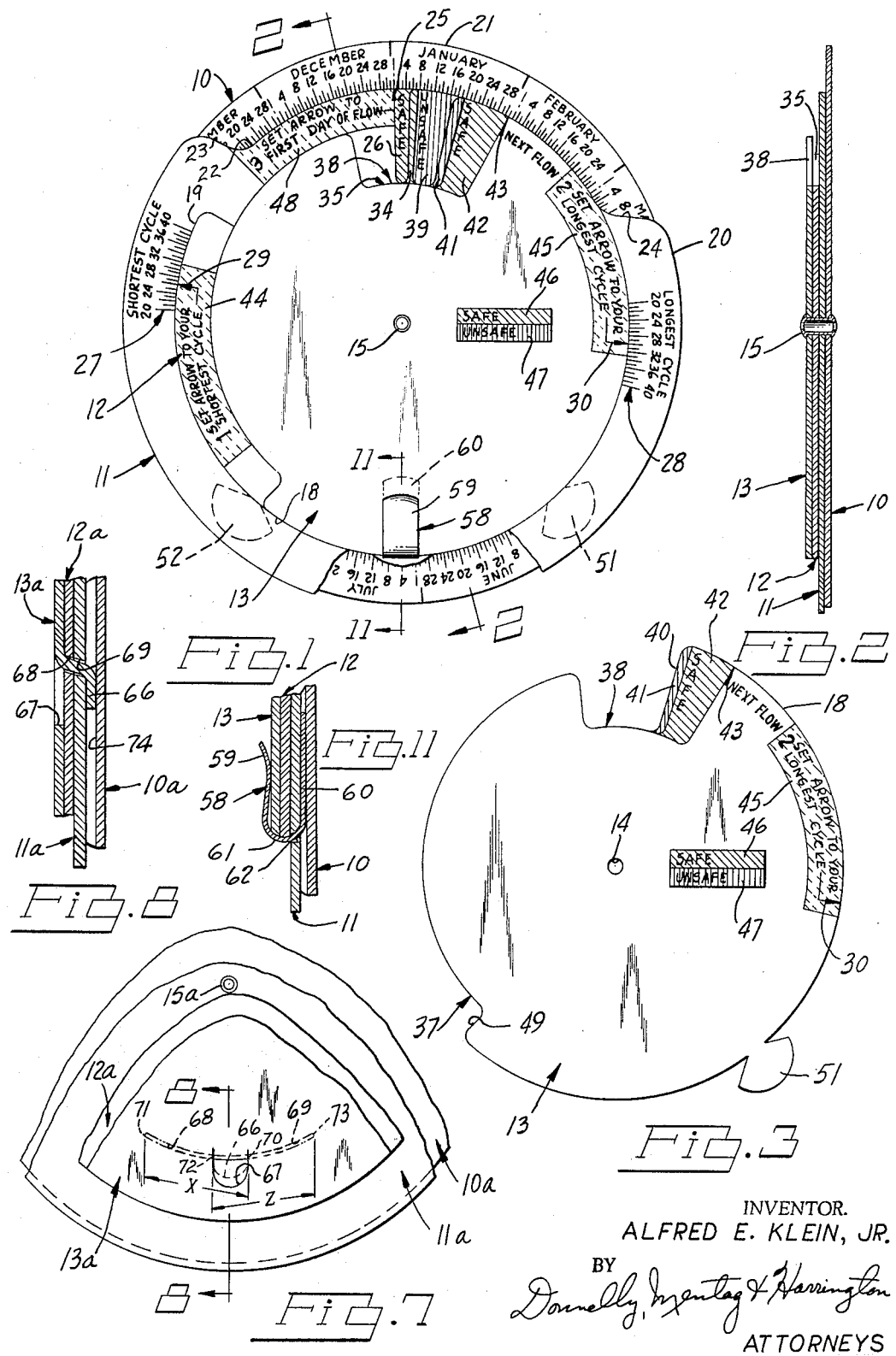
INVENTOR.
ALFRED E. KLEIN, JR.
BY Donnelly, Mentag & Harrington
ATTORNEYS Oct. 11, 1966  A. E. KLEIN, JR  3,278,118
FERTILITY CYCLE INDICATOR
Filed March 24, 1966  2 Sheets-Sheet 2
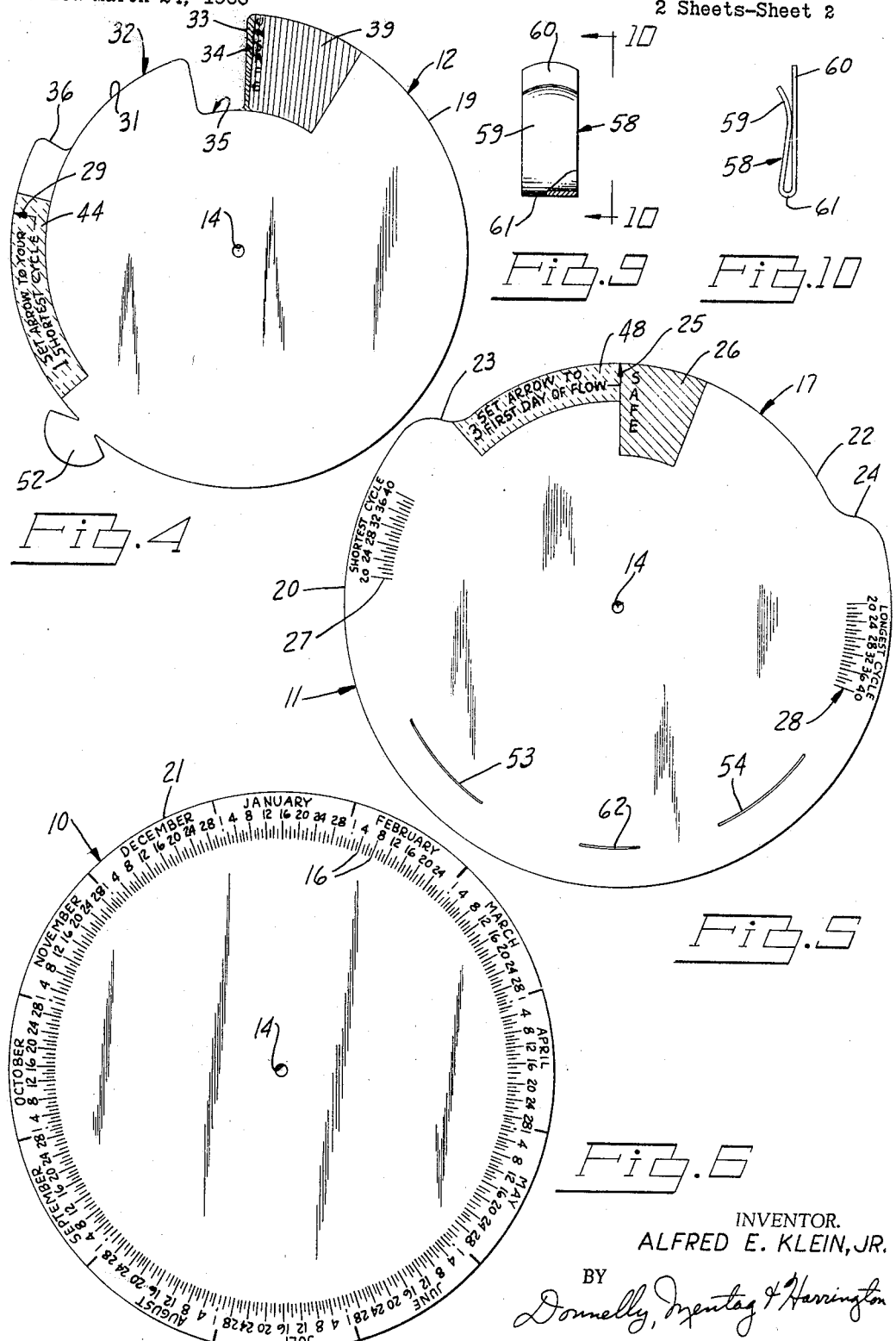
INVENTOR.
ALFRED E. KLEIN, JR.
BY
Donnelly, Mentag & Harrington
ATTORNEYS

United States Patent Office 3,278,118
Patented Oct. 11, 1966

3,278,118
FERTILITY CYCLE INDICATOR
Alfred E. Klein, Jr., Redford Township,
Wayne County, Mich.
Filed Mar. 24, 1966, Ser. No. 537,226
10 Claims. (Cl. 235—88)

My invention relates generally to the art of determining the periods of sterility and fertility in women, and more particularly to a novel and improved dial computer for determining said periods.

Heretofore, different types of devices have been provided for determining the periods of sterility and fertility in women, including dial type indicators or computers and slide rule type indicators. The present invention and such prior art devices are based on well known facts which have been established by medical studies and which reveal that there is a definite rhythmic pattern between ovulation and the onset of the next menstrual flow, namely that ovulation occurs fourteen to sixteen days prior to menstruation. Medical science also has established that the life span of the ovum does not exceed twenty-four hours, and that the fecundating power of the male cell exists for forty-eight hours, at the most. The foregoing medical facts provide a basis for computing fertility and sterility periods.

My invention is based on the aforementioned medically established facts and, accordingly, it can be stated that the 14th, 15th and 16th days prior to the next menstruation must be reserved for the period of ovulation, the 17th and 18th days for the life span of the male cell, and the 13th day reserved for the life span of the ovum. I employ a safety factor before and after this fertile period because, although the human body functions in a rhythmic manner, it does not function with the precise accuracy of a fine watch. Thus, in accordance with my invention, the 19th and 12th days are reserved for possible oscillations or fluctuations.

Most women do not have a menstrual period of exactly the same length every time. Accordingly, in order to make use of the afore-stated medical facts it is necessary to keep accurate records to determine the sterile and fertile periods each month. The keeping of such records and the determining of these periods is confusing and troublesome to many women. The aforementioned prior art devices for determining the periods of sterility and fertility in women were attempts to overcome the problems encountered by women in keeping such records. However, it has been found that such prior art devices have inherent disadvantages. For example, a problem encountered with some dial computer type and slide rule type prior art devices is that the previous settings are changed or altered and require resetting if the cycle length setting or other settings are changed. Also, some of said prior art devices have limited calendar scales. That is, they have one scale for all months with thirty days, another scale for months with thirty-one days followed by months of thirty or thirty-one days and so forth. Other such devices have a limited cycle length range. Some devices obscure the reading when a change is made from one cycle length to another.

In view of the foregoing, it is an object of this invention to provide an improved dial computer of the class described which overcomes the aforedescribed disadvantages of the prior art fertility and sterility indicator devices.

It is another object of the present invention to provide an improved dial computer for determining fertile and sterile periods which is simple and compact in construction, and simple to operate in that it requires only three settings the first time it is used by a particular person and thereafter only one setting by said person.

It is a further object of the present invention to provide a novel and improved fertility and sterility dial computer which incorporates a calendar scale of 365 days so as to eliminate any confusion of the number of days contained in any of the months of the calendar year.

It is still another object of the present invention to provide an improved fertility and sterility dial computer that features color coded expanding segments which indicate at a glance a fertile and sterile period of a woman.

It is still a further object of the present invention to provide an improved fertility and sterility dial computer which includes a full range of cycle lengths which are in full view of the user at all times due to the novel structure of the computer which limits the range of the cycle selector dials to their specific area or field on the cycle length dial, and which also prevents the shortest cycle length dial from being erroneously set for a longer cycle length than the longest cycle length dial, or vice versa.

Other objects, features and advantages of this invention will be apparent from the following detailed description, appended claims, and the accompanying drawings.

In the drawings:

FIG. 1 is a front plan assembly view, with parts broken away, of a dial computer made in accordance with the principles of the present invention and showing the parts thereof in a position for determining the sterile and fertile periods of a woman having a normal menstrual cycle length that varies or fluctuates from 26 to 30 days and whose current menstrual cycle begins on the first day of January;

FIG. 2 is an elevational section view of the dial computer illustrated in FIG. 1, taken along the line 2—2 thereof, and looking in the direction of the arrows;

FIG. 3 is a plan view of the top or longest menstrual cycle selector dial employed in the dial computer of FIG. 1;

FIG. 4 is a plan view of the second or shortest menstrual cycle selector dial employed in the dial computer illustrated in FIG. 1;

FIG. 5 is a plan view of the third or menstrual cycle length dial employed in the dial computer illustrated in FIG. 1;

FIG. 6 is a plan view of the bottom or calendar dial employed in the dial computer illustrated in FIG. 1;

FIG. 7 is a fragmentary, front plan assembly view of a modified portion of the dial computer illustrated in FIG. 1;

FIG. 8 is a fragmentary, enlarged, elevational section view of the structure illustrated in FIG. 7, taken along the line 8—8 thereof, and looking in the direction of the arrows;

FIG. 9 is a front elevational view of a dial locking clip employed in the invention;

FIG. 10 is a right side elevational view of the dial locking clip illustrated in FIG. 9, taken along the line 10—10 thereof, and looking in the direction of the arrows; and, FIG. 11 is a fragmentary, enlarged, elevational section view of the structure illustrated in FIG. 1, taken along the line 11—11 thereof, and looking in the direction of the arrows.

Referring now to the drawings, and in particular to FIGS. 1 and 6, the numeral 10 generally indicates the base member of the dial computer of the present invention. The base 10 is illustrated as comprising a disc provided with a circular or annular calendar dial, however, it will be understood that the base may be of a shape other than a disc and provided with a circular calendar dial. The dial computer of the present invention further includes the three flat discs 11, 12 and 13 which are superimposed and rotatably secured together at their common centers on the base 10. The discs 10, 11, 12 and 13 are provided with graduations on their outer faces, as described hereinafter, and they are also referred to hereinafter as dials. It will be understood that the discs 10 through 13 may be formed from any suitable material, as for example, paper, cardboard, plastic, and the like.

As best seen in FIG. 6, the base 10 has a circular calendar dial printed, engraved or etched around the periphery thereof, with the calendar marked with the twelve months of the year and comprising 365 equally spaced, staggered length lines indicated by the numeral 16. The lines 16 represent the days in each month of the calendar year, and they are marked at every fourth line for each month. It will be understood that the lines 16 may be numbered in multiples other than 4, as for example 5. As shown in FIGS. 3 through 6, the four dials 10, 11, 12, and 13 of the dial computer are each provided with an axial mounting hole 14 for the reception of a suitable means 15 for rotatably mounting the dials relative to each other, as for example a pivot pin or rivet (FIG. 1).

As shown in FIGS. 1 and 2, the third dial 11 is mounted adjacent the base 10 and may be termed the cycle length dial. As best seen in FIG. 1, the outer periphery 20 of the cycle length dial 11 is made to a diameter larger than the diameter of the base dial 10. The numeral 21 indicates the outer periphery of the smaller diameter base dial 10. The larger diameter of the cycle length dial 11 facilitates rotation of the calendar dial or base dial 10. It will also be seen that the cycle length dial 11 is provided with an arcuate cut-out or relieved area, generally indicated by the numeral 17 in FIG. 5, which is made to a reduced radius 22 relative to the rotational axis of the cycle length dial 11. As shown in FIG. 1, the inner side or periphery of the circular calendar dial on the base dial 10 is spaced radially outward from the axis of the hole 14 in the base dial 10 and commences at a radius equal to the radius of the periphery 22 of the reduced or cut-out portion 17 formed in the cycle length dial 11. As shown in FIG. 1, the outer peripheries 18 and 19 of the dials 13 and 12, respectively, are disposed concentric with the inner periphery of the circular calendar dial on the base dial 10. The circular calendar dial on the base dial 10 extends radially outward from the last mentioned radius to the periphery 21 of the base dial 10. As shown in FIG. 5, the peripheral cut-out area 17 on the cycle length dial 11 extends along the periphery 22 between the points generally indicated by the numerals 23 and 24.

The arcuate, cut-out peripheral area 17 on the cycle length dial 11 must have a peripheral length or span sufficient to permit viewing of a portion of the circular calendar dial on the base 10 to enable the user to set the arrow 25 relative to this calendar dial on the first day of menstrual flow. As illustrated, the length of the cut-out area 17 is approximately equal to 120 day lines or segments 16.

As shown in FIG. 5, the arrow is disposed on a radius line on the cycle length dial 11, at a position between the ends 23 and 24 of the cut-out area 17. An arcuate segment 26 is marked on the cycle length dial 11 to the immediate right of the arrow 25, or clockwise relative thereto as viewed in FIG. 5. The segment 26 is marked with the word "safe," and it is color-coded a suitable color, as for example, green. The "safe" segment 26 must be at least 29 day lines 16 in length to equal the sum of the eight day fertile zone and the twenty day cycle range, plus a half-day before the fertile zone and a half-day after the cycle range. The directions for setting the arrow 25 relative to the circular calendar dial are printed to the left of the arrow 25 and comprise the statement "set arrow to the first day of flow." The arcuate area 48 around these instructions may be colored, as for example, yellow.

As shown in FIGS. 1 and 5, the cycle length dial 11 is provided with a pair of areas or fields 27 and 28 representing the shortest cycle length and the longest cycle length, respectively. Each of these fields comprises twenty-one lines and numbers every fourth line, with the lines being equal and identical to the lines 16 on the calendar dial on the base dial 10. These lines are numbered in multiples of fours and start with the numeral 20 and end with the numeral 40. It will be understood that these lines may be numbered in multiples of fives and start with the number 20 and end with the number 40. The fields 27 and 28 represent the full range of cycle length variation in an average normal healthy woman. The shortest cycle length field is disposed on an arc to the left, or counterclockwise, from the arrow 25. The longest cycle length field 28 is disposed on an arc to the right, or clockwise, from the arrow 25. The fields 27 and 28 are disposed at a radial distance from the axis of the dial 11 equal to the radius of the cut-out or recessed portion 17 of the cycle length dial 11, and to the outer peripheries or diameters 18 and 19 of the longest and shortest cycle selector dials 13 and 12, respectively. The location of the fields 27 and 28 on the cycle length dial 11 must be in direct relationship to their respective cycle selector arrows 29 and 30, on the dials 12 and 13, respectively.

As shown in FIG. 4, the shortest cycle selector dial 12 is provided with a radius terminating at the periphery 19 and which is equal to the radius of a recessed or cut-out area 17 of the cycle length dial 11. The periphery 19 of the dial 12 is provided with a notched-out or recessed area 32 and which is bounded by the periphery or radius line 31. The recessed area 32 is arcuately shaped and extends between the terminals or ends 33 and 36. Adjacent the right end or clockwise end of the recessed area 32 is a radially inward extension recessed or notched-out area 35. The arcuate length or span of the recessed area 32 must be sufficient to permit the viewer to see the instructions in the colored area 48 on the cycle length dial 11 for setting the arrow 25 to the first day of the menstrual flow.

In FIGS. 1 and 4, the shortest cycle selector dial 12 is provided with an expanding segment for the sterile period 26 of the cycle length dial 11. The expanding segment is indicated by the numeral 34 and is disposed adjacent the right end 33 of the recessed area 32 on the dial 12. The segment 34 is colored green and extends radially inward from the outer periphery 19 to the radius of the recessed extension 35. It will be understood that the sterile period indicated by the word "safe" and by the numeral 26 of the cycle length dial 11 is adapted to indicate the commencing of the sterile period prior to ovulation, and that it expands as the cycle length is increased and this expansion is provided by the expanding element 34 which indicates when said safe period terminates.

The shortest cycle selector dial 12 is further provided with an arcuate segment 39 which is colored red and disposed on the right side of the expanding safe segment 34. The red segment 39 is marked "unsafe" and represents the fertile area. The shortest cycle selector dial 12 is also provided with an arrow 29 to the left of which is marked the words "set arrow to your shortest cycle." The arrow 29 is disposed with the tip on the periphery 19 of the dial 12. The arcuate area in which the arrow 29 and its setting directions are disposed is indicated by the numeral 44 and is colored yellow.

As shown in FIGS. 1 and 3, the longest cycle selector dial 13 has a radius equal to the radius of the recessed portion 17 of the cycle length dial 11 for the greater portion of its larger periphery 18. The radius of the periphery 18 is also equal to the radius of the periphery 19 of the shortest cycle selector dial 12. The longest cycle selector dial 13 is provided with an arcuate peripheral notched recess area 37 which extends radially inward and terminates in a radius equal to the radius 31 of the recessed area 32 on the shortest cycle selector dial 12. The recessed area 37 extends between the end points 40 and 49. The recessed area 37 is of a sufficient length or span to permit the user to view and set the arrow 25 on the cycle length dial to the first day of flow and also for viewing instructions and setting the shortest cycle selector arrow 29 to its shortest cycle field setting. The right end of the recessed area 37 is provided with a radially inward directed extension 38 to provide an area where the colored coded "safe" and "unsafe" segments may be viewed on the cycle length dial 11 and the shortest cycle selector dial 12.

As shown in FIG. 3, the longest cycle selector dial 13 is provided with an expanding segment for the fertile period which is indicated by the numeral 41 adjacent the end 40 of the recessed area 37. The expanding segment for the fertile period is colored red and it is used in conjunction with the red fertile segment 39 on the shortest cycle selector dial. Accordingly, the fertile or "unsafe" period commences on the shortest cycle selector dial 12 and terminates with the expanding element 41 on the longest cycle selector dial 13. The sterile or "safe" period after ovulation is indicated by the stationary segment 42 on the longest cycle selector dial 13. The sterile or "safe" segment 42 is disposed to the right of the expanding segment 41, and it is colored green and marked "safe." The segments 41 and 42 extend radially inward from the outer periphery 18 to the radius of the recessed extension 38. As shown in FIGS. 1 and 3, the right end of the safe expanding segment 42 terminates along a radius line which is provided with the arrow 43 at the outer end thereof, and which has disposed to the right thereof the notation "next flow." The longest cycle selector dial 13 is further provided with the arrow 30 which is disposed to the right of the safe expanding segment 42 in a peripheral spaced apart position, and which has disposed next to it the notation "set arrow to your longest cycle." The arrow 30 and its setting directions are disposed in an arcuate area 45 which is colored yellow. The color coding for the "safe" and "unsafe" periods is indicated on the face of the longest cycle selector dial 13 by the two rectangular areas marked "safe" and "unsafe," indicated by the numerals 46 and 47, and marked by the colors green and red, respectively.

In order to determine the location of the arrow 25 on the cycle length dial 11 and the arcuate length of the two sterile areas and the fertile areas, it is necessary to take a basic example, such as a twenty-eight day cycle and compute the sterile fertile periods in the following described manner. For example, if menstruation began on January 1, the arrow 25 on the cycle length dial 11 would have to be positioned at this point and the green segment 26 commences to the right of the arrow 25 and extend clockwise a sufficient distance to cover the full range of the short cycle length field 27. The short cycle length field 27 contains twenty-one lines and, accordingly, the green segment or "safe" field 26 would b eextended for a length of approximately twenty-two days from the right side of the arrow 25. The expanding green segment 34 on the shortest cycle selector dial 12 would conclude and the "unsafe" red segment 39 would commence midway between January 9 and January 10 on the calender dial 10. The red "unsafe" segment 39 should have a minimum span to include the full range of both cycle length fields when the shortest cycle selector arrow 29 is set at its minimum setting and the longest cycle selector arrow 30 is set at its maximum setting. Said minimum span for the segment 39 would be approximately thirty days. The expanding "unsafe" red segment 41 would conclude and the green "safe" segment 42 would commence midway between January 17 and January 18 on calendar dial 10. The "safe" green segment 42 will extend clockwise to "the next flow" arrow 43 which should be positioned at January 29 of the calendar dial 10 to indicate the commencing of the next cycle. The expanding segments 34 and 41 should be at least two day lines 16 in arcuate length.

Either of two methods may be employed to confine the cycle selector dials 12 and 13 to their specific cycle length fields 27 and 28 and to eliminate confusion which might occur if the cycle selector dials were left to turn at will, namely the obscuring of instructions and arrows 25 and 29.

The first method is to employ the use of tabs 51 and 52 which are located on the periphery of each of the cycle selector dials 13 and 12, respectively, and which are inserted in the slits or openings 54 and 53, respectively, that are located on the cycle length dial 11. The slits 53 and 54 are disposed at a distance from the axis of the dial 11 equal to the radii 18 and 19 of the cycle selector dials 13 and 12, respectively. The positioning of these slits or openings 53 and 54 is determined by the location of the tabs 52 and 51, or vice versa, and they are of a length sufficient to cover the full range of the areas comprising the cycle fields 27 and 28, respectively, plus the width of the tabs 52 and 51, respectively, at the junction point with the cycle dials 13 and 12.

The second method of confining the cycle selector dials 12 and 13 to their specific fields 27 and 28 is to provide a tab 66 cut from the longest cycle selector dial 13a as shown in FIGS. 7 and 8. The use of this tab 66 calls for a slight modification of the dials 11, 12 and 13, and the corresponding parts of the modification of FIGS. 7 and 8 have been marked with the same reference numerals as used in the first described embodiment followed by the small letter "a." As best seen in FIG. 8, the tab 66 is adapted to be extended rearwardly through the slits or openings 67, 68 and 69 formed through the dials 13a, 12a, and 11a, respectively.

The openings or slits 68 and 68 are located at a distance from the axis of the dials 10a through 13a equal to a radius extending to the upper portion of the tab 66 on the longest selector dial 13a. The positioning of the arcuate slits or openings 68 and 69 is determined by the location of the tab 66 or vice versa, and they are of sufficient length or span to cover the full range of the shortest cycle and longest cycle fields 27 and 28, respectively, plus the width of the tab 66. As shown in FIG. 7, the slits appear as they would if the shortest cycle selector dial 12a and the longest cycle selector dial 13a were both set to a setting of 40 in their respective cycle length field areas 27 and 28.. The slit 68 in the shortest cycle selector dial 12a extends between the end points 70 and 71, over the span indicated by the letter "X." The slit 69 in the cycle length dial 11a extends between the end points 72 and 73, over the span indicated by the letter "Z." As shown in FIG. 8 the end of the tab 66 is turned downwardly so as to rest in a parallel position with the various dials in the space 74 between the base dial 10a and the cycle length dial 11a. It should be understood that tab 66 as shown in FIG. 7 is halted by the extreme left end 72 of slit 69 from rotating clockwise and exceeding the useful range of 40 in the cycle length field area 28. The right end 73 of slit 69 halts the tab 66 from rotating counterclockwise and exceeding the useful range of 20 in the cycle length field area 28. As best seen in FIG. 8, the prime purpose of the slit 68 is to permit the tab 66 to extend through the longest cycle dial 12a so that it may be inserted in the slit 69 of the cycle length dial 11a. A second function of slit 68 as shown in FIG. 7, which is novel and unique is that the right end 70 of said slit halts the tab 66 and the longest cycle arrow 30 (FIG. 1) from turning clockwise and indicating a lesser amount of days in the longest cycle field area 28 than is indicated by the shortest cycle arrow 29 in the shortest cycle length area 27. Likewise the right end 70 of slit 68 also restricts and halts the short cycle selector dial 12a from turning clockwise and indicating a higher amount of days in the shortest cycle length field 27 (FIG. 1) than is indicated by the longest cycle arrow 30 in the longest cycle field 28. This novel feature makes it completely impossible to erroneously set either the shortest cycle arrow 29 or longest cycle arrow 30 to a number of days greater or lesser, respectively, than is indicated by its counterpart arrow.

As an aid to simplify future monthly settings of the dials and to make the dial computer require only one setting for future determinations there is provided a slit or opening 62 through the cycle length dial 11 at a distance from the axis of the dials equal to the radii 18 and 19 of the cycle selector dials 13 and 12, respectively. A clip generally indicated by the numeral 58, or even a common paper clip, is then inserted through this opening 62 to hold and fasten the two cycle selector dials 12 and 13 to the cycle length dial 11 at the specific cycle length range required by the user, leaving the calendar dial 10 to be set each month to the first day of flow, and to provide a quick and accurate reading of the safe and unsafe periods. As shown in FIG. 11, clip 58 has the outer leg 59 which extends up over the outer face of the dial 13. A rear leg 60 is disposed between the dials 10 and 11. The front and rear legs 59 and 60 are joined by the bight or U-shaped portion 61.

The operation of the dial computer of the present invention will be understood from the following example. Assume that the user is trying to arrive at the sterile and fertile period of a woman with a normal cycle length that varies or fluctuates from 26 to 30 days, and whose current cycle began on January 1st. Referring to FIG. 1, the user would first set the shortest selector arrow 29 to the line 26 in the shortest cycle field and then proceed to set the longest cycle selector arrow 30 to line 30 in the longest cycle field. The two dials 12 and 13 would then be locked in place to the cycle length dial 11 by means of the clip 58. The user would then rotate the calendar dial 10 until the first day of flow arrow 25 is pointing to January 1 on the calendar dial. The dials 10 through 13 would then be disposed in the position shown in FIG. 1. All days falling within the green segment, namely January 1st through January 7th, and January 20th through January 30th are sterile. January 31st is the first day of the next cycle. All days falling within the red area are fertile, namely January 8th through January 19th. It will be understood, that as the longest cycle selector arrow 30 is advanced to a longer cycle length, the red segment expands. Likewise as the shortest cycle length selector arrow 29 is advanced to a longer cycle length, the green segment expands and the red segment contracts. For succeeding months, with the dials 12 and 13 clamped to the dial 11, it is only necessary to rotate the calendar dial 10 to the first day of flow to determine the periods of sterility and fertility of the next, or the then current, cycle.

It will be understood that the dial computer of the present invention may also be used to determine the exact number of days in each current cycle by merely moving the next flow arrow to the day menstruation commenced and observing where the longest cycle selector arrow 30 is pointing. It will be understood that the base dial 10 may be made part of a display card on which instructions for using the dial computer may be mounted, if desired. It will also be seen that the dial computer of the present invention provides a rhythm guide which features two expanding segments and which never obscures pertinent data. The rhythm guide also confines the movements of the cycle selector dials to their respective fields and further confines the movements of the cycle selector dials so that they cannot exceed their useful range within their respective fields. The rhythm guide of the present invention provides a novel feature wherein the cycle selector dials will be locked together, so that only one setting is required for future period determinations after the dials 11 through 13 have been initially disposed relative to each other for the initial determination.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:
1. A dial computer for determining a woman's periods of sterility and fertility, comprising:
  (a) a base member provided with a circular calendar dial comprising 365 segments and having indicia thereon to indicate the months and days of a year;
  (b) three dials superimposed and rotatably mounted on said base member and comprising, a menstrual cycle length dial mounted on said base member, a shortest menstrual cycle selector dial mounted on top of the menstrual cycle length dial, and a longest menstrual cycle selector dial mounted on top of the shortest menstrual cycle selector dial;
  (c) said cycle length dial having,
    (1) a first day of flow indicator on the cycle length dial disposed adjacent the periphery of the cycle length dial and adapted to be disposed adjacent a selected day on the calendar dial on the base member when the base member and cycle length dial are rotated relative to each other,
    (2) an arcuately disposed shortest cycle field and an arcuately disposed longest cycle field on the periphery of the cycle length dial and in peripherally spaced apart positions, and,
    (3) a sterile segment on the periphery of said cycle length dial adjacent said first day of flow indicator;
  (d) said shortest cycle selector dial being disposed on said cycle length dial so as to expose said shortest cycle field and said longest cycle field, and having,
    (1) a cut-out area exposing said first day of flow indicator and said sterile segment on said cycle length dial,
    (2) a shortest cycle indicator disposed adjacent the periphery of the shortest cycle selector dial, and,
    (3) a fertile segment adjacent the periphery of the shortest cycle selector dial and the right end of said last mentioned cut-out area; and,
  (e) said longest cycle selector dial being disposed on said shortest cycle selector dial so as to expose said shortest cycle field and said longest cycle field, and having,
    (1) a cut-out area exposing said first day of flow indicator and said sterile segment on said cycle length dial and said shortest cycle indicator and the fertile segment on said shortest cycle selector dial,
    (2) a longest cycle indicator disposed adjacent the periphery of the longest cycle selector dial, and,
    (3) a sterile segment adjacent the periphery of the longest cycle selector dial and the right end of said last mentioned cut-out area, wherefore, when said shortest cycle indicator is set to a day line in the shortest cycle field corresponding to the number of days in the shortest menstrual cycle of a woman, and the longest cycle indicator is set to a day line in the longest cycle field corresponding to the number of days in the longest menstrual cycle of a woman, and the first day of flow arrow on the cycle length dial is set to the first day line of a menstrual cycle on the calendar dial, the sterile and fertile segments on said dials will be disposed adjacent and span the day lines on the calendar dial which indicate the days of the woman's cycle that are sterile and the days that are fertile.

2. A dial computer as defined in claim 1, wherein:
  (a) said sterile and fertile segments are colored.

3. A dial computer as defined in claim 1, wherein:
(a) the shortest cycle dial has a sterile segment adjacent the fertile segment and adapted to overlap the sterile segment on the cycle length dial.

4. A dial computer as defined in claim 1, wherein:
(a) the longest cycle dial has a fertile segment adjacent the sterile segment and adapted to overlap the fertile segment on the shortest cycle dial.

5. A dial computer as defined in claim 1, wherein:
(a) the shortest cycle dial has a sterile segment adjacent the fertile segment and adapted to overlap the sterile segment on the cycle length dial; and,
(b) the longest cycle dial has a fertile segment adjacent the sterile segment and adapted to overlap the fertile segment on the shortest cycle dial.

6. A dial computer as defined in claim 1, including:
(a) means for securing the shortest cycle and longest cycle dials to the cycle length dial after the shortest cycle and longest cycle indicators have been set relative to the shortest and longest cycle fields.

7. A dial computer as defined in claim 1, including:
(a) means for restricting the movement of the shortest cycle and longest cycle dials relative to the cycle length dial and to each other.

8. A dial computer as defined in claim 7, wherein:
(a) said means for restricting the movement of the shortest cycle and longest cycle dials comprises a tab on each of these dials adapted to extend through and slide in an opening on said cycle length dial.

9. A dial computer as defined in claim 7, wherein:
(a) said means for restricting the movement of the shortest cycle and longest cycle dials comprises tab means on the longest cycle dial extended through and slidable in openings formed through said shortest cycle dial and said cycle length dial so as to restrict the longest cycle indicator from indicating a lesser number of days than is indicated by the setting of the shortest cycle indicator and vice versa.

10. A dial computer as defined in claim 1, wherein:
(a) said cycle length dial is provided with a peripheral, arcuate cut-out area exposing a sector of the calendar dial on the base member;
(b) said first day of flow indicator on the cycle length dial is disposed adjacent the periphery of said cut-out area; and,
(c) said sterile segment on the cycle length dial is disposed on the periphery of said cut-out area.

No references cited.

RICHARD B. WILKINSON, *Primary Examiner.*